United States Patent Office 2,757,435
Patented Aug. 7, 1956

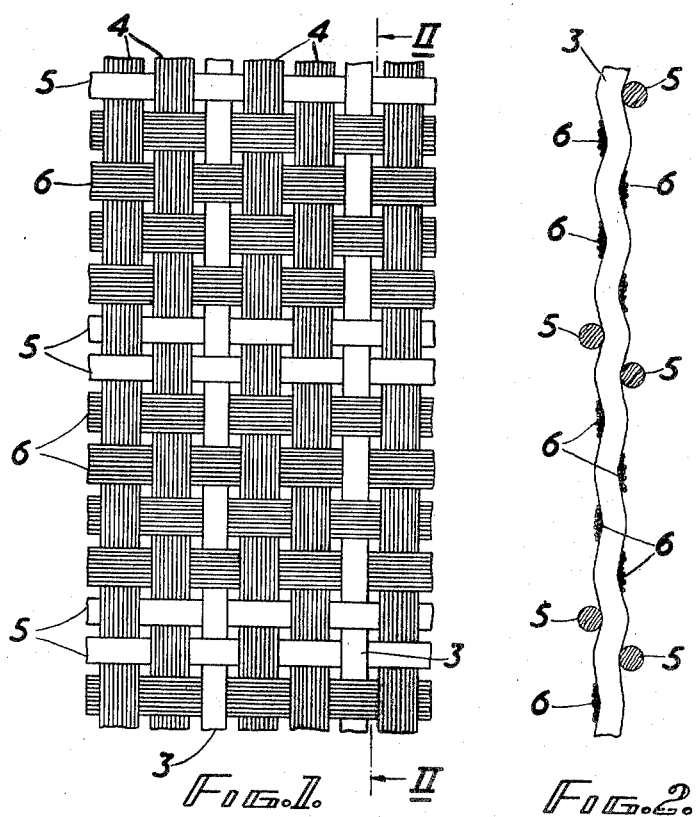

2,757,435

FUSED FABRIC ASSEMBLIES

Lajos Bihaly, London, England, assignor to Trubenised Company (Registered Trust), Vaduz, Lichtenstein, a corporation of Lichtenstein Application September 23, 1952, Serial No. 311,140

Claims priority, application Great Britain September 28, 1951

2 Claims. (Cl. 28—78)

This invention relates to so-called fused fabric assemblies, that is semi-stiff fabrics composed of two or more separately manufactured fabric plies superimposed upon one another and adhesively united together by means of thermoplastic elements contained in at least one of the plies. Commonly the assembly consists of three plies of woven or knitted fabric, the two outer plies being normal fabrics composed wholly of threads or strands of cotton, linen, wool or other non-thermoplastic material while the central ply (which is usually referred to as the interlining) contains both non-thermoplastic strands and strands at least in part of thermoplastic material. The thermoplastic strands in the interlining being spaced apart from one another by the non-thermoplastic strands, the plies become adhesively united together over a large number of small separate areas only and the assembly remains permeable to air and moisture. The invention is not concerned with the type of assembly wherein the adhesive appears as a continuous layer or film, coated onto one or more of the surfaces of the constituent fabrics.

Hitherto, the thermosplastic strands used in interlining for fused fabric assemblies have been made of cellulose acetate, which has a melting-point above the maximum temperature to which the non-thermoplastic constituents of the assembly can safely be subjected. Accordingly, either the interlining must be treated with a plasticiser for the cellulose acetate, so that the latter will become adhesive when subjected to a suitable degree of heat and pressure, or (more usually) the whole fabric assembly is treated with a solvent for the cellulose acetate after making up into the form of the required garment, or other article, and immediately before subjecting the assembly to heat and pressure to effect fusion.

In either case adhesion between the fabric layers is effected as a result of pressure acting on the more or less freely flowing adhesive to force the adhesive into the pores and around the fibres of the solid yarns. It is therefore of great advantage to have most of the adhesive located between the outer fabric layer and the interlining and not buried within the thickness of the latter. This is achieved by weaving the adhesive yarn with a large amount of crimp in comparison with the non-adhesive yarns in the interlining, to lift the adhesive out of the plane of the cotton yarns. For example, in a form of interlining material now commercially available the acetate warp strands in a piece of fabric 100 yards long measure about 130 yards, whereas the cotton warp strands measure less than 110 yards.

The present invention, however, is concerned with interlinings for fused fabric assemblies in which the thermoplastic material, which forms, or is included in, some of the strands of the fabric, while solid at atmospheric temperatures, melts, or softens sufficiently to become adhesive, at a temperature well below the maximum to which the other constituents of the assembly can safely be subjected. When such an interlining is used, no treatment with plasticisers or solvents is necessary, fusion of the assembled fabric plies being effected simply by the application of heat and pressure.

One thermoplastic material which has been found satisfactory for use is polythene (polyethylene), which has a melting point of about 105° C. The manner of carrying the invention into practice is described below with reference to the use of this material, but the invention includes also the use of other thermoplastic materials having similar properties, for example polystyrene.

In the commercially available threads of thermoplastic materials suitable for use in interlining fabric, the thermoplastic material is in a molecularly orientated condition as a result of the extrusion and/or drawing operations used in the manufacture of the thread. On heating such a thread, disorientation of the material occurs and, unless it is forcibly restrained, the thread contracts longitudinally and increases in thickness. In the case of polythene the degree of contraction is substantial, an unrestrained thread heated to just below its melting point being reduced to approximately half its original length. Accordingly, the mere substitution for the cellulose acetate threads normally used in the interlining of commercially available polythene threads of equivalent weight would not result in the production of a satisfactory fused fabric assembly and special measures of some kind are required.

In accordance with the present invention the strands of the interlining which consist wholly or in part of polythene or other thermoplastic material are given a thickness which substantially exceeds the thickness (measured in the direction of the thickness of the fabric) of at least those non-thermoplastic strands of the fabric which extend parallel with the thermoplastic threads.

The required difference in thickness can be obtained by the use of large diameter monofils for the thermoplastic strands and by the use of flat, ribbon-like structures for the non-thermoplastic strands. Alternatively, the non-thermoplastic strands may be formed by yarns composed of a number of small diameter filaments laid up with little or no twist, (as, for example, silk or rayon yarns); it is then only necessary that the thermoplastic strands should have a diameter substantially greater than that of the individual filaments of the non-thermoplastic yarns.

Such interlining fabrics can be woven with sufficient crimp in the thermoplastic strands to permit the contraction of the latter upon heating to take place without causing contraction of the non-thermoplastic strands. Although the crimp is eliminated during the course of the fusing operation, sufficient adhesive material is available on the surface of the interlining to give satisfactory adhesion between the plies of the assembly.

An interlining fabric in accordance with the present invention is shown by way of example in the accompanying drawing, in which Figure 1 shows a plan view of a small portion of the fabric on an enlarged scale and Figure 2 shows a section taken on the line II—II of Figure 1.

The fabric illustrated is a plain weave fabric having a warp composed of one polythene monofil 3 and two cellulose acetate yarns 4 alternately. The monofils 3 may measure 125 microns in diameter and the acetate yarns 4 may each be composed of twenty filaments of two to three denier (about fifteen microns in diameter). There may be forty ends of polythene and eighty ends of acetate per inch. The weft of the fabric is composed of two polythene monofils 5 and four acetate yarns 6 alternately. The monofils 5 are similar to the monofils 3 and the yarns 6 are similar to the yarns 4. There may be a total of 60 to 70 picks per inch.

It is to be remarked that for the purposes of the present invention cellulose acetate can be used for the non-adhesive strands of the interlining, since when not treated with a solvent or plasticiser it does not soften sufficiently to become adhesive at any temperature to which the fabrics are subjected in practice. Since solvents or plasticisers which would affect rayon yarn are not employed when using interlinings in accordance with the present invention, the fabric plies which are fused together by the interlinings may also be composed wholly or in part of such yarn.

The polythene used in the interlinings is preferably a high polymer, having an average molecular weight of not less than about 15,000. When the fused fabric assemblies made from the interlinings are ironed after washing, the polythene is again melted or softened and if a soft polythene, having an average molecular weight of (say) 13,000 has been employed, sufficient polythene may sweat through onto the surface of the article to cause unsightly discolourations after a few launderings. By employing a hard polythene having an average molecular weight of (say) 20,000 this effect is eliminated or greatly reduced in extent.

I claim:

1. A mixed fabric for use in the production of fused fabric assemblies, comprising non-adhesive strands each composed of a plurality of fine filaments consisting of organic material, laid up with little twist to no twist and interwoven with one another to constitute a fabric, and monofils of a thermoplastic material which is solid at atmospheric temperatures, but becomes adhesive by heating it to a temperature to which the first mentioned strands of organic material can be subjected without damage, said monofils being distributed over the whole area of the fabric and interwoven with said first mentioned strands and having a diameter substantially greater than that of the individual filaments of said strands.

2. A fabric according to claim 1, in which the thermoplastic material is polythene having an average molecular weight of not less than 15,000.

References Cited in the file of this patent

UNITED STATES PATENTS

| | | |
|---|---|---|
| 1,968,410 | Liebowitz | July 31, 1934 |
| 2,233,477 | Hilberg | Mar. 4, 1941 |
| 2,298,071 | Smith | Oct. 6, 1942 |
| 2,460,674 | Bihaly | Feb. 1, 1949 |
| 2,491,396 | Seckel | Dec. 13, 1949 |

FOREIGN PATENTS

| | | |
|---|---|---|
| 462,011 | Great Britain | Mar. 1, 1937 |